(12) United States Patent
Veselka

(10) Patent No.: US 8,478,689 B1
(45) Date of Patent: Jul. 2, 2013

(54) DEBIT CARD PROCESSING

(76) Inventor: Randall D. Veselka, Littleton, CO (US)

(*) Notice: Subject to any disclaimer, the term of this patent is extended or adjusted under 35 U.S.C. 154(b) by 0 days.

(21) Appl. No.: 13/355,751

(22) Filed: Jan. 23, 2012

(51) Int. Cl.
*G06Q 40/00* (2012.01)

(52) U.S. Cl.
USPC .............................................. 705/39; 705/35

(58) Field of Classification Search
USPC ..................................... 705/39, 35
See application file for complete search history.

(56) References Cited

U.S. PATENT DOCUMENTS

| | | | |
|---|---|---|---|
| 5,012,077 A * | 4/1991 | Takano | 235/380 |
| 5,748,737 A * | 5/1998 | Daggar | 705/41 |
| 6,662,166 B2 * | 12/2003 | Pare et al. | 705/39 |
| 2002/0087465 A1* | 7/2002 | Ganesan et al. | 705/39 |
| 2003/0110329 A1* | 6/2003 | Higaki et al. | 710/36 |

OTHER PUBLICATIONS

Bank_Technology_News; "Cards: RBC Brings Canda's Debit Culture to U.S.: RBC is the first Canadian bank to offer debit card usuage . . . "; Dec. 2004; ISSN: 1060-3506.*
Perry, Gail; "Trends, new legislation fuel an increase in e-payments"; Nov. 8, 2004; ISSN: 1044-5714.*
Caskey, John P, Sellon, Gordon H Jr; "Is the debit card revoluion finally here?"; 4th Q of 1994; Economic Review; ISSN: 0161-2387.*

* cited by examiner

*Primary Examiner* — Edward Chang
(74) *Attorney, Agent, or Firm* — Bejin VanOphem & Bieneman PLC

(57) ABSTRACT

In a payment terminal that includes a processor and a memory, a request is received to process a transaction using a payment card, the request specifying a transaction amount. It is determined whether the payment card is a debit card or a credit card. If the payment card is a debit card, a service fee to be added to the transaction amount is determined and added to the transaction amount. A request is sent to a payment processor to approve the transaction. If the transaction is approved, the transaction is processed such that a charge in the amount of the transaction amount plus the service fee is associated with the payment card.

17 Claims, 3 Drawing Sheets

```
        ABC STORE                          ABC STORE
      4534 Any Street                    4534 Any Street
    Somewhere, NY 111111               Somewhere, NY 111111
       (555)-777-8888                     (555)-777-8888
  -----------------------            -----------------------
  08/19/2011         15:04            08/19/2011         15:04
  Trans #:3    Batch #: 15            Trans #:3    Batch #: 15

SALE                               SALE

Acct:      ***********1244          Acct:      ***********1244
  Type:          Debit                Type:          Debit
  Entry:         Card Swiped          Entry:         Card Swiped
  Base Amt:      $21.00               Base Amt:      $21.00
  Debit SVC:     $ .39                Debit SVC:     $ .39

AMOUNT: $21.39                      AMOUNT: $21.39
  Resp:        APPROVED               Resp:        APPROVED
  Code:          001477               Code:          001477

MERCHANT COPY                       CUSTOMER COPY
```

DEBIT CARD PROCESSING

CROSS-REFERENCE TO RELATED APPLICATIONS

The present application claims priority to U.S. Provisional Application Ser. No. 61/556,453, filed Nov. 7, 2011, entitled "DEBIT CARD PROCESSING", which provisional application is hereby incorporated by reference in its entirety.

BACKGROUND

Payment cards, e.g., debit cards, credit cards, and the like, provide a convenient and widely used payment mechanism at merchant locations around the world. Transactions using a payment card are very often conducted electronically. A merchant location may have one or more terminal devices equipped to read data from a magnetic strip on a payment card, e.g., when the card is "swiped." A terminal device may be connected to a network, and may thereby communicate with a payment processor. The payment processor may in turn communicate with the issuing institution via the network or some other network.

Processing rules for different payment cards may be different. For example, present merchant terminals may be configured to process credit card transactions differently than debit card transactions. However, present merchant terminals have not been configured to differentiate between various kinds of payment cards, but rather have required user input or a query to a payment processor to make such differentiation. Either way, use of payment terminals has been inefficient and cumbersome with respect to determining a type of payment card.

Further, different kinds of debit cards, e.g., pin-based debit cards and signature debit cards (also sometimes referred to as check cards) have historically been treated differently. For example, pin-based debit cards have historically been associated with being able to assess a service fee charged by a merchant, whereas signature debit cards, due to card payment network restrictions, have not.

BRIEF DESCRIPTION OF THE DRAWING FIGURES

FIG. 3 illustrates an exemplary receipts for a debit card transaction processed according to the process of FIG. 2.

DETAILED DESCRIPTION OF THE PREFERRED EMBODIMENTS

System Overview

Figure 1:
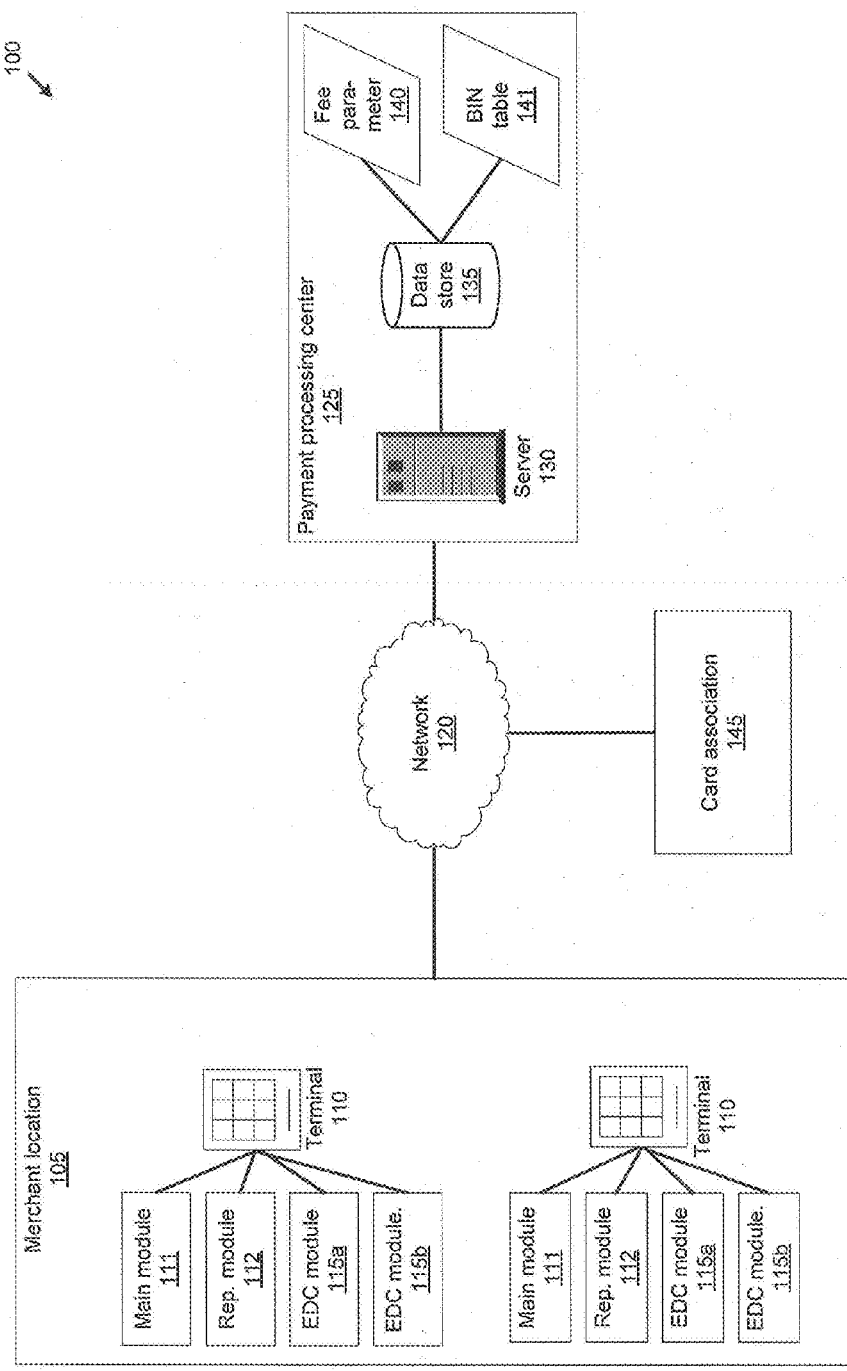
FIG. 1 illustrates an exemplary system for conducting a transaction using a payment card.

FIG. 1 illustrates an exemplary system 100 for conducting a transaction using a payment card. A merchant 105 includes one or more payment terminals 110, which in turn each include various sets of program instructions, such as a main module 111, a reporting module 112, and one or more electronic draft capture (EDC) modules 115. Terminals 110 communicate with a payment processing center 125 via a network 120. Payment processing center 125 generally includes a processing server 130 and a data store 135.

Fee parameter 140, used to determine fees applied to a debit card transaction at a merchant 105, and also BIN (bank information number) data, e.g., in a BIN table 141, are generally stored in a memory included in the payment terminal 110, and may also may be stored and/or downloaded from data store 135 and/or server 130. BIN table 141 stores information relating to payment card BIN numbers, e.g., identifying a type of a payment card (credit card, debit card, gift card, etc.) as well as other information.

Card association 145 may also be in communication with payment processing center 125 via the network 120, or some other network.

Merchant 105 may include a location, or a set of locations, associated with a particular entity, e.g., a particular business, including one or more payment terminals 110. Further, as stated below, merchant 105 may be a virtual merchant with virtual terminals 110. Although only one merchant 105 is illustrated in FIG. 1, it is to be understood that, in general, system 100 is likely to include tens, hundreds, thousands, or even more merchants 105, each merchant 105 including one or more terminals 110.

Payment terminal 110 may be a virtual terminal, i.e., a customer may purchase goods or services through a website, application, personal computer, mobile device, wireless device, and/or point-of-sale system or dedicated payment terminal, or the like and may provide information sufficient to pay for the goods or services using a payment card through a form or the like provided within the website, application, etc. In some instances, where payment terminal 110 is a physical device located within a merchant 105, payment terminal 110 may be a known device such as the Vx570 or 8320, both sold by VeriFone, Inc. of San Jose, Calif., a Dejavoo Payment Terminal sold by iPOS, Inc., or any Point-of-Sale software system with a integrated card payment terminal such as IRIS sold by XPIENT Solutions LLC, of Charlotte, N.C.

A single payment terminal 110 is generally configured to process different kinds of payment cards, e.g., credit cards and debit cards. For example, a payment terminal 110 may be configured to process Visa, American Express, Discover, and MasterCard credit cards, as well as debit cards usable through networks provided by Visa, MasterCard, Star System, Pulse, etc.

Fee parameter 140 may be stored in a file, relational table, or the like, and generally includes an amount of a service fee to be charged for a debit card transaction. Further, the fee parameter 140 may include multiple service fees, e.g., the fee parameter 140 may specify different service fees to be assessed for different transaction amounts or some other criteria such as a specification of a percentage of a transaction amount that is to constitute a service fee.

BIN table 141 is generally included in payment data store 135, e.g., as one or more relational tables. BIN table 141 includes sets or ranges of BINs (bank identification numbers) i.e., the numbers, or portions thereof, that appear on credit cards, and associates the BINs with a type of payment card. The payment terminal 110 generally downloads data, e.g., for the BIN table 141, and receives updates on a regular basis, from the payment processing center 125. For example, the BIN table 141 may be updated in payment terminal 110 on a daily, weekly, or as needed basis.

Main module 111 included in payment terminal 110 includes program instructions for performing operations such as described below. For example, main module 111 includes instructions for obtaining information concerning a payment card, detecting a type of payment card, and selecting an appropriate EDC module 115, among other operations.

Reporting module 112 includes program instructions for generating reports.

EDC modules 115 and other program instructions included in terminals 110 may be created according to any one of a variety of known programming technologies, such as the C programming language. For example, a first EDC module 115a may be used to process a first type of payment card transaction, while a second EDC module 115b is used to process a second type of payment card transaction through a terminal 110 that includes both EDC modules 115. Operations carried out at least in part according to instructions included in one or more EDC modules 115 are described in more detail below.

Network 120 is a packet network and is generally an internet protocol (IP) network. As such, network 120 generally uses one or more known protocols for transporting data, such as user datagram protocol (UDP), transport control protocol (TCP), hypertext transfer protocol (HTTP), etc. Further, network 120 may include a variety of networks such as a wide area network (WAN), e.g., the Internet, a local area network (LAN), etc. In some cases, an addition or alternative to network 120 may be created by instantiating a dial up connection over conventional telephone lines, e.g., between data center 120 and card association 140. As is known, packet network 120 may be used to transport a variety of digital data. Network 120 may include wireless and/or wired elements.

Payment processing center 125 generally includes a payment server 130 and a payment data store 135. Further, it is to be understood that, for purposes of efficiency, scalability, and redundancy, payment processing center 125 generally includes multiple devices performing operations ascribed herein to payment server 130 and payment data store 135. Payment server 130 and payment data store 135 may include various software that includes instructions for performing some or all of the operations described herein. Payment processing center 125, generally via server 130, may be in communication with terminals 110 and card association 145 via one or more networks such as network 120.

Card association 145 as illustrated in FIG. 1 represents a processing center of a payment card provider, e.g., Visa, MasterCard, etc. It is to be understood that the system 100 will generally include multiple card associations 145, although only one card association 145 is illustrated in FIG. 1 for convenience and ease of explanation herein. As described further below, payment processing center 125 may communicate with card association 145 for various purposes, such as authorizing payment card transactions requested from a merchant 105, settling transactions with card association 145, etc.

Computing devices such as terminals 110, server 130, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., the Linux operating system, etc. Computing devices may include any one of a number of known computing devices, including, without limitation, a point of sale terminal, a computer workstation, a desktop, notebook, laptop, or handheld computer, or some other known computing device.

Computing devices generally each include instructions executable by one or more computing devices such as those listed above. Computer-executable instructions may be compiled or interpreted from computer programs created using a variety of known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein such as data store 135, may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and is accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Process Flow

Figure 2:
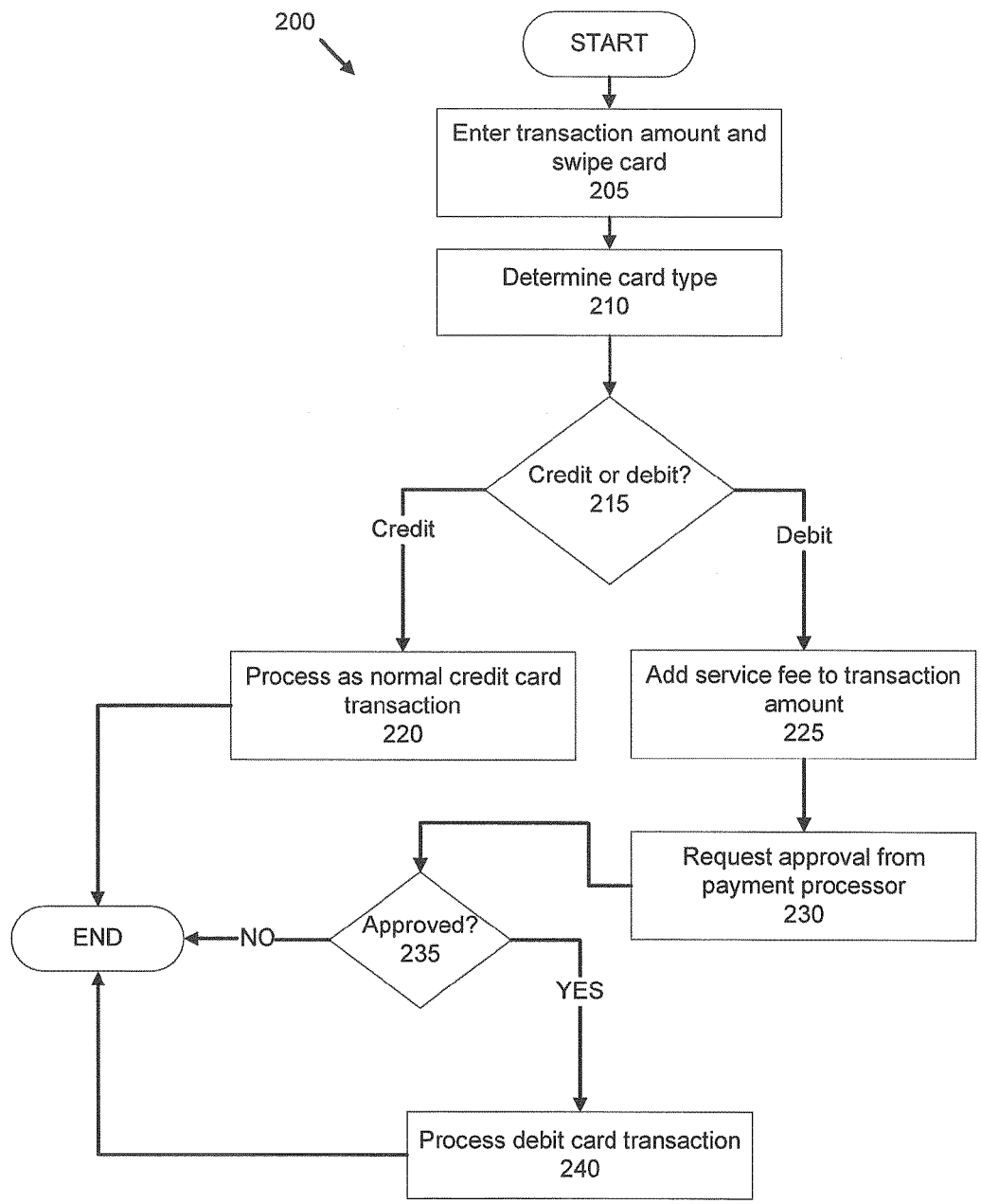
FIG. 2 illustrates an exemplary process for processing a payment card transaction in a terminal.

FIG. 2 illustrates an exemplary process 200 for processing a payment card transaction in a terminal 110.

The process 200 begins in a step 205 when input is provided to the payment terminal 110 to identify a payment card being used for the transaction, as well as a transaction amount, e.g., an amount paid for goods or services plus applicable tax or other fees, etc. Generally, input identifying a payment card is provided by swiping a card's magnetic strip through a card reader attached to the payment terminal 110, although such input could be provided via other mechanisms, such as entering a number printed on the card. Likewise, a transaction amount may be entered via a numeric keypad, calculated automatically via inputs provided by a barcode scanner or the like, etc.

Next, in a step 210, the payment terminal 110, e.g., according to instructions in the module 111, consults BIN table 141 to determine if a type of payment card swiped or otherwise identified as described above with respect to step 205 is a credit card or a debit card.

If the card is a credit card, then step 220 is executed next. Otherwise, step 225 is executed next.

In step 220, payment terminal 110, e.g., according to instructions in the module 111, uses an EDC module 115 for processing credit card transactions to process the present transaction as a credit card transaction, after which the process 200 ends.

In step 225, an EDC module 115 for processing debit card transactions is invoked. The EDC module 115 adds a service fee, according to the fee parameter 140, to the transaction amount provided as described above with respect to step 205.

Next, in step 230, payment terminal 110, e.g., according to instructions included in the EDC module 115, requests approval for the transaction from the payment processor 125. It will be understood that the payment processor 125 may in turn communicate with, including request approval from, card association 145.

Next, in step 235, payment terminal 110 determines whether the transaction has been approved, e.g., receives a response from the payment processing center 125. If the transaction was not approved, e.g., declined by the payment processor 125, no response was received from the payment processor 125, etc., then the process 200 ends. Otherwise, step 240 is executed next.

In step 240, the transaction initiated in step 205 is processed as a debit card transaction such that the customer or cardholder is charged the transaction amount plus the service fee. It will be understood that the transaction may be processed through payment processing center 125 and/or card association 145.

FIG. 3 illustrates exemplary receipts for the transaction that may be generated in step 240.

Following step 240, the process 200 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites explicitly to the contrary.

What is claimed is:

1. A method, comprising:
    receiving, in a payment terminal that includes a processor and a memory, a request to process a transaction using a payment card, the request specifying a transaction amount;
    determining, in the payment terminal and without user input, whether the payment card is a debit card or a credit card;
    if the payment card is a debit card, determining a service fee to be added to the transaction amount and adding the service fee to the transaction amount, wherein no service fee is added to the transaction amount if the payment card is a credit card, wherein the service fee is based on at least one of the transaction amount and a fee parameter;
    sending a request to a payment processor to approve the transaction; and
    if the transaction is approved, processing the transaction such that a charge in the amount of the transaction amount including any service fee is associated with the payment card.

2. The method of claim 1, further comprising using bank identification number (BIN) data downloaded from the payment processor when determining whether the payment card is a debit card or a credit card.

3. The method of claim 1, further comprising periodically updating the BIN data in the payment terminal.

4. The method of claim 1, wherein the fee parameter is stored in the memory of the payment terminal.

5. The method of claim 1, wherein the payment terminal is a dedicated terminal.

6. The method of claim 1, wherein the payment processor requests approval for the transaction from a card association.

7. The method of claim 1, wherein the payment terminal is at a merchant location.

8. A system comprising a payment terminal that includes a processor and a memory, the memory including instructions executable by the processor for:
    receiving a request to process a transaction using a payment card, the request specifying a transaction amount;
    determining, in the payment terminal and without user input, whether the payment card is a debit card or a credit card;
    if the payment card is a debit card, determining a service fee to be added to the transaction amount and adding the service fee to the transaction amount, wherein no service fee is added to the transaction amount if the payment card is a credit card, wherein the service fee is based on at least one of the transaction amount and a fee parameter;
    sending a request to a payment processor to approve the transaction; and
    if the transaction is approved, processing the transaction such that a charge in the amount of the transaction amount including any service fee is associated with the payment card.

9. The system of claim 8, the instructions further comprising instructions for using bank identification number (BIN) data downloaded from the payment processor when determining whether the payment card is a debit card or a credit card.

10. The system of claim 8, the instructions further comprising instructions for periodically updating the BIN data in the payment terminal.

11. The system of claim 8, wherein the fee parameter is stored in the memory of the payment terminal.

12. The system of claim 8, wherein the payment terminal is a dedicated terminal.

13. The system of claim 8, wherein the payment processor requests approval for the transaction from a card association.

14. The system of claim 8, wherein the payment terminal is at a merchant location.

15. A non-transitory, tangible computer-readable medium including instructions executable by a processor for:
- receiving a request to process a transaction using a payment card, the request specifying a transaction amount;
- determining, in the payment terminal and without user input, whether the payment card is a debit card or a credit card;
- if the payment card is a debit card, determining a service fee to be added to the transaction amount and adding the service fee to the transaction amount, wherein no service fee is added to the transaction amount if the payment card is a credit card, wherein the service fee is based on at least one of the transaction amount and a fee parameter;
- sending a request to a payment processor to approve the transaction; and
- if the transaction is approved, processing the transaction such that a charge in the amount of the transaction amount including any service fee is associated with the payment card.

16. The medium of claim 15, the instructions further comprising instructions for using bank identification number (BIN) data downloaded from the payment processor when determining whether the payment card is a debit card or a credit card.

17. The medium of claim 15, wherein the fee parameter is stored in the memory of the payment terminal.

* * * * *